(12) United States Patent
Lofstrand et al.

(10) Patent No.: US 8,310,950 B2
(45) Date of Patent: Nov. 13, 2012

(54) SELF-CONFIGURING NETWORKING DEVICES FOR PROVIDING SERVICES IN A NEWORK

(75) Inventors: Jan Mikael Markus Lofstrand, Sandenvaegen (SE); Jason Thomas Carolan, Denver, CO (US)

(73) Assignee: Oracle America, Inc., Redwood City, CA (US)

( * ) Notice: Subject to any disclaimer, the term of this patent is extended or adjusted under 35 U.S.C. 154(b) by 567 days.

(21) Appl. No.: 12/647,721

(22) Filed: Dec. 28, 2009

(65) Prior Publication Data
US 2011/0158088 A1 Jun. 30, 2011

(51) Int. Cl.
*H04J 1/16* (2006.01)

(52) U.S. Cl. .................... 370/252; 370/229; 709/250

(58) Field of Classification Search .................. 370/229, 370/230, 231, 235, 241, 252, 356, 395.53; 709/206, 217, 222, 223, 224, 227, 226, 231, 709/235, 245, 250; 707/804, 836; 719/317
See application file for complete search history.

(56) References Cited

U.S. PATENT DOCUMENTS

| | | | |
|---|---|---|---|
| 6,718,486 B1* | 4/2004 | Roselli et al. ................... 714/41 |
| 7,383,355 B1* | 6/2008 | Berkman et al. .............. 709/246 |
| 7,711,783 B1* | 5/2010 | Violleau et al. ............... 709/206 |
| 2003/0140119 A1* | 7/2003 | Acharya et al. ............... 709/219 |
| 2005/0044197 A1* | 2/2005 | Lai .................................. 709/223 |
| 2006/0092861 A1* | 5/2006 | Corday et al. ................. 370/256 |
| 2008/0040470 A1* | 2/2008 | Bogner ......................... 709/223 |
| 2008/0040478 A1* | 2/2008 | Bogner ......................... 709/224 |
| 2008/0147885 A1* | 6/2008 | Bessis .......................... 709/250 |
| 2009/0177768 A1* | 7/2009 | Kind et al. .................... 709/224 |
| 2010/0235481 A1* | 9/2010 | Deutsch et al. ............... 709/222 |
| 2010/0241712 A1* | 9/2010 | Nitzsche et al. ............. 709/206 |
| 2010/0241762 A1* | 9/2010 | Deutsch et al. ............... 709/245 |
| 2010/0242053 A1* | 9/2010 | Nitzsche et al. ............. 719/317 |
| 2010/0332622 A1* | 12/2010 | Carolan et al. ................ 709/220 |

* cited by examiner

*Primary Examiner* — Abdullah Riyami
(74) *Attorney, Agent, or Firm* — Marsh Fischmann & Breyfogle LLP; Kent Lembke

(57) ABSTRACT

A method for use in a datacenter for load balancing services. A native registry is operated to provide a naming service storing service access information for services active in a network. On a node, an instance of a service is provided, and the native registry is updated with access information for the service. The method includes providing a content switch with a node controller such as on a network device. The method includes obtaining, with the node controller, service configuration information for the service from the native registry that includes the service access information. The node controller activates the service on the network by configuring the content switch based on the obtained service configuration information. The method includes the service node publishing a service definition for the service that includes the service access information and other information such as a service name, an IP address, and a load balancing algorithm.

15 Claims, 5 Drawing Sheets

SELF-CONFIGURING NETWORKING DEVICES FOR PROVIDING SERVICES IN A NEWORK

BACKGROUND

1. Field of the Description

The present description relates, in general, to providing services in an efficient and well-managed manner via a network such as within or via a datacenter, and, more particularly, to methods and systems for providing a self-configuring content switch such as within a switch or access point to a pull-based computer system (e.g., a datacenter) used to provide services to clients.

2. Relevant Background

Datacenters are evolving into a more automated network-centric model, which may be applied to both public and private cloud computing. Networking, platform, storage, and software infrastructure may be provided as services that scale up or down upon demand. The network-centric model allows the datacenter to be viewed as a collection of automatically deployed and managed application services that utilize the underlying and virtualized services and/or computer resources.

Within existing datacenters and other service networks, it has proven difficult to synchronize the network equipment including high volumes of virtualized applications. Additionally, there are demands for methods and systems for providing services that are more scalable to meet growing or changing needs of clients in a network and to balance loads as services are accessed and deployed in a dynamic manner. Stated differently, there is an ongoing demand for ways of providing sufficient elasticity and scalability in a secure fashion for the rapidly growing needs of a datacenter, and such ways or methods typically may have to provide automatically managed services that can scale efficiently and without limits so as to let services adapt easily to changing requirements and workloads.

The present or typical datacenter may fail to meet all of these needs or demands. For example, a typical enterprise system for services may be built upon the push model for providing services. This may involve configurations for services being pushed out from a central server or centralized provider of services out to one or more servers that then act to provide the service and handle relationships including ingress and egress (which may involve a template providing a fixed set of relationships or a model the provides dynamic relationships). Such a push model may not support ready scaling to suit changing demands and is susceptible to failure, e.g., a centralized service manager may go down or become unavailable terminating access to a number of services. As will be understood by those skilled in the art, the traditional approach to automation of the management of services is to implement centralized provisioning systems that deploy individual services onto target systems. This approach limits scalability since regardless of the size of the centralized system there is always a limit to its capacity and throughput. The centralized system can break if there is a demand peak for its services that outstrips its capacity.

SUMMARY

Briefly, a technique is described for providing a self-configuring content switch in a service providing system (such as a datacenter) that works effectively in the pull model and in an event-based model of providing and updating/adding services. The content switch may be a load balancer or the like that is provided in a network device (e.g., a physical or logical network device) that receives and processes service requests (e.g., on the periphery of a service or service group). Service instances are provided on one or more nodes of the service providing system, and the services/nodes are configured to publish service information (e.g., register service with a virtual service registry that provides the information available on the network/system as advertised/published by the service instances such as service name, instance key, IP address, egress port, load balancer algorithm(s), and other information that makes the service instance unique and facilitates access). A native registry is provided in the system/network that may be a naming service storing service access information and additional information about the service. A node controller associated with or loaded on the network device for the content switch may function to perform service discovery and/or to listen to updates to the native registry, and, in response, to update the service configuration for the services that it activates/provides to clients/external network accessing the services via the network device.

More particularly, a method is provided for load balancing service provision in a computer network (such as via operation of a datacenter). The method includes providing a native registry (e.g., a naming service such as DNS) in memory/data storage of the computer network/system, with the native registry storing service access information for services available/active in the computer network. On a node of the computer network, an instance of a service is provided and then the native registry is updated with a set of service access information for the service associated with the provided service instance. The method also includes providing a content switch in the computer network (such as on a network device exposed to an external network and/or service clients that provide requests including service access IP (e.g., a service name and the like)), and a node controller is provided or loaded for the content switch. The method includes obtaining service configuration information for the service from the native registry (such as with the node controller) that includes at least a portion of the service access information. The node controller is then operated to activate the service on the computer network including configuring the content switch (and/or a service group) based on the obtained service configuration information. Note, the method is well-suited for spanning other types of network systems such as firewalls, intrusion detection systems (IDS), and the like and/or other core and periphery network services.

The method may include, prior to the updating of the native registry, operating the service node to publish a service definition for the service (or to advertise this newly added/modified (or even subtracted) service), and the definition typically includes the service access information. The definition may include a service name and the content switch performs its configuration step by associating an IP address with the service based on this service name. The service definition may also be published to a virtual registry service made up of the information advertised by all service instances on the computer network that facilitates service discovery in the network by the node controller of the content switch. The native registry may then perform updating of its service access information using information provided in the virtual registry service.

The service definition may also include a load balancing algorithm for the service, and the content switch's node controller may activate the service based on the load balancing algorithm (e.g., adapt its service group configuration based on this LB algorithm). The service definition may further include an IP address and/or an egress port for the service instance, and the content switch may use this information in its automated/self configuring and/or in activating/providing the service on the computer network. During operation of the system the node controller listens for service discovery updates indicating a new service has been added (or a service has been modified or subtracted/removed) to the native registry. In response, the node controller accesses the native registry to obtain service configuration information and to update its configuration of the content switch (or the service group configurations).

DETAILED DESCRIPTION

Briefly, the following description is directed to methods and systems for more efficiently managing services provided in or via a computer system or network (e.g., an internal network as that found in a datacenter). The system and method may be built-upon a highly scalable pull or event-based model or approach for providing services and use standard extensions to name services such that available services are readily discoverable by a content switch (e.g., a load balancer), which is adapted (such as with a node controller) to dynamically and asynchronously configure itself. In such a system and method, a network device may provide this service content switch and play a significant role in managing services, and the network device may be a physical device (hardware) and/or provide network functions with logic (software) such as a firewall or other network device. The services/service nodes may advertise themselves, e.g., as they become available/online or are changed/modified, to the network device (which may be a plug and play module), and the network device may continuously (synchronously or, more typically, asynchronously) configure itself based on these service advertisements/messages.

The techniques described herein may provide a number of advantages over prior service management and delivery techniques. For example, one advantage is that the method allows network automation to be provided while saving time and effort of adding content switches (or load balancing devices) to a network. This minimizes the need for training staff to be able to configure content switches (including the initial configuration of a load balancer in some cases). The methods and systems, as is discussed in more detail below, provide the ability for services to be managed and discovered using native registries (such as a Domain Name System (DNS) registry or the like). Linkages are provided in embodiments between using service discovery and services broadcasting their availability and abilities (service definition and/or service access information). The methods and systems described advantageously build upon a pull model of service provision with services being added and subtracted from the network/datacenter on an ongoing basis. Such dynamic service availability and managed access is achieved with the application or service (e.g., group of service instances) making itself available to a virtual registry service (as is described and defined in more detail below).

Figure 1:
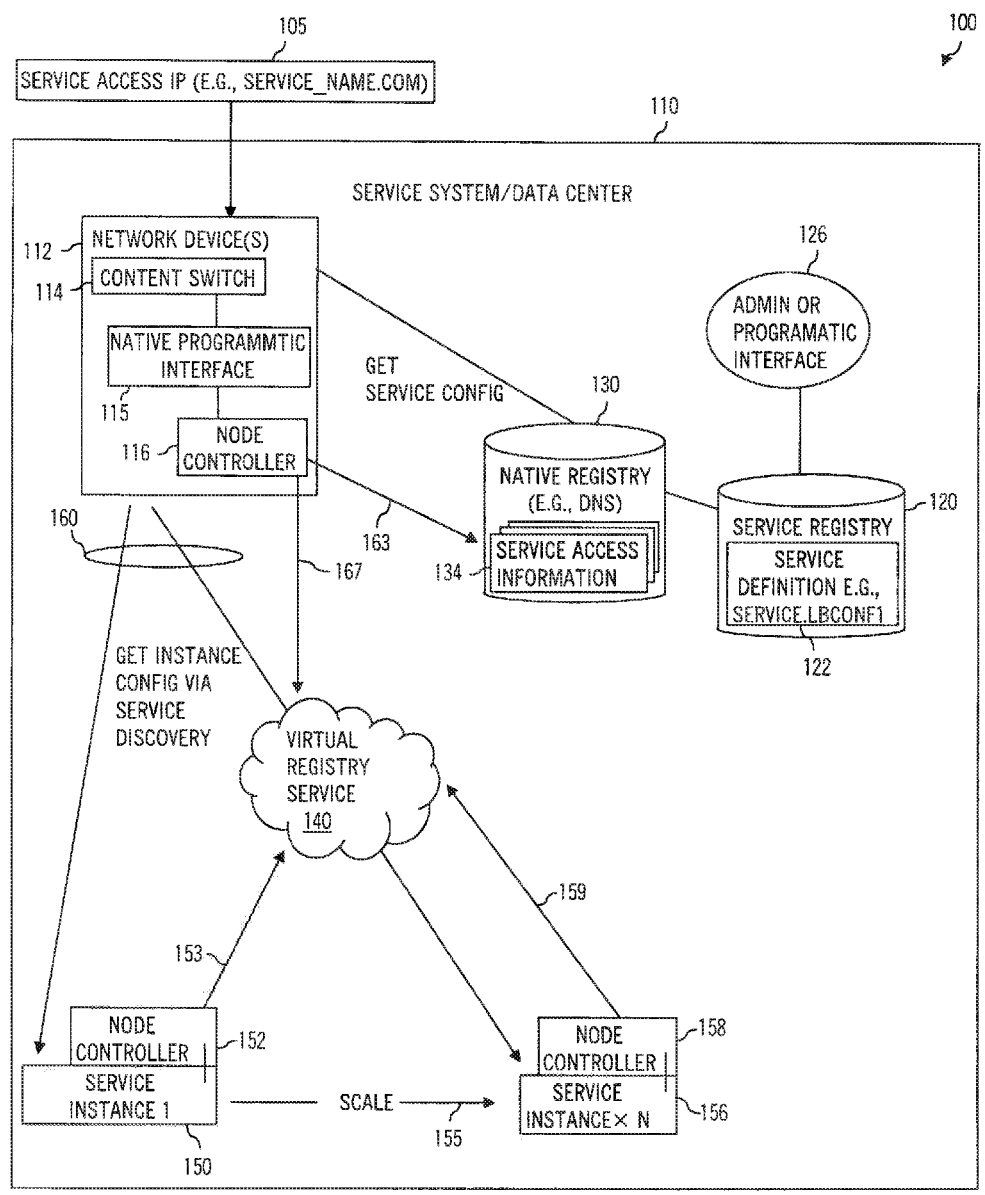
FIG. 1 is a functional block diagram of computing environment with a computer system providing enhanced service management including a self-configuring content switch such as within a network device used to provide access to services via a network or datacenter.

FIG. 1 illustrates a computing environment 100 in which a self-configuring content switch 114 (e.g., a load balancer or the like) may be utilized to provide enhanced service management and balancing of loads in a system or network 110 used to provide services. As shown, the service system 110 (which may be provided in the form of a datacenter with a number of software and hardware devices including computers, servers, and other devices with processors and operating systems (OS) running/managing running software modules or executable code devices to provide the described functionality including self-configuring load balancing and pull model of service delivery and access). The components of the system 110 may be provided on a single device/box or more often on two or more computer/data storage devices provided in a networked manner (e.g., devices linked by an internal network). A network device 112 may be provided to provide a communication connection with clients and/or an outer/other network to allow accessing of services such as via service access IP 105 (e.g., accessing a service by providing "service_name.com" or the like in a service request/query). The network device 112 may be implemented with one or more hardware device (physical boxes) and/or via logic to provide network device functions (such as a firewall or the like).

Significantly, the network device 112 includes a content switch 114 (e.g., a load balancer is one example of such a content switch) to manage load on services and resources of the service system 110. The content switch 114 may also provide the networking function that is a target for configuration. The content switch 114 may be a hardware device or software on a server (e.g., the network device 112) to which virtual service configurations are deployed and/or updated during Operation of the system 110. To this end, the content switch 114 may be configured with an auto-configure node controller 116 and a native programmatic interface 115 (e.g., CLI, XML, and the like) may be provided between the content switch 114 and the node controller 116. The controller 116 may be adapted to listen for service discovery advertisements and updates (e.g., as shown with arrows 153, 159 from service instance 150, 156 and/or corresponding node controllers 152, 158 on nodes of system 110 providing the services 150, 156).

In addition, the node controller 116 may communicate with a service registry 120 and with a native registry 130 to get information as shown with arrow 163 (e.g., to obtain service configuration, access, and/or definition information). The node controller 116 may also act as shown with arrow 167 to get service instance configuration information via service discovery over a virtual registry service 140. The node controller 116 may also publish and advertise the virtual services it hosts in the service system 110 to clients that may access the services via service access IP-based requests 105.

The system 110 may include an administrative or programmatic interface 126 that may be operated by a system 110 operator to create service definitions 122 in the service registry 120. The service registry 120 may take the form of an information repository in system memory or data storage that stores/holds specific information 122 about the services provided by instances 150, 156. The stored service definitions 122 for example may include some or all of the information necessary to configure the content switch 114 (e.g., service configuration as shown at 163).

The system 110 also includes a native registry 130 that stores service access information 134. Typically, the native registry 130 may be a naming service that stores the service access information 134 and, in some cases, additional information about each service 150, 156 available in the system 110 that is used for unique service access configuration by the node controller 116 of the content switch 114. The native registry 130 may be a naming service configured with additional records so that the content switch 114 (via controller 116) may pick up/obtain 163 information 134 it may use to configure virtual IPs (shown at 105) and virtual services (e.g., as may be done by the controller 116 via service discover 167 to the virtual registry service 140). The name service/registry 130 may be configured to advertise these services 150, 156 and updates on the network (e.g., an internal or external network). The content switch 114 may be adapted to find the name services/native registry 130 (again, typically, with the node controller 116) and may, in some cases, do this by using DHCP (Dynamic Host Configuration Protocol), multicast DNS, or the like. Once this information has arrived into the content switch 114, the content switch 114 may run a configuration script that adds the proper configuration (e.g., self/auto configuration of the balancer 114).

During operation of the system 110, the network device 112 received service requests 105 and controls service traffic 160 to attempt to balance the load on the servers/nodes that host the services 150, 156. These servers/nodes may be considered target nodes that may be configured (such as with a node controller 152, 158 associated with each service instance 150, 156 that may be added or removed from system 110 to provide scalability as shown with arrow 155) to advertise their services to the content switch 114 as shown by arrows 153, 159 through a virtual registry service 140. The content switch 114 via controller 116 may read the information (as shown with arrow 167) and run a configuration script to add the proper configuration. This may be done using multicast DNS (mDNS) in combination with DNS-SD or using DNS (e.g., when the servers hosting service instances 150, 156 are not on the local network). If the servers hosting the services do not have the ability to advertise the services, the content switch 114 may use IP address and port scanning (or other techniques) to retrieve proper information for configuration.

In the system 110, each service definition 122 stored in the service registry may include the information necessary to configure the content switch 114 such as service names, load balancing algorithms, health checking details for a group, and the like. The virtual registry service 140 may be thought of as being made up of the information that is available on the network or in the system 110 via advertising 153, 159 by the service instances 150, 156. The information, for example, may include a key, an IP address, a TCP/UDP port, and other information that may make a service instance 150, 156 unique. Each service instance 150, 156 is the publisher that advertises its service to the node controller 116 of the content switch 114 (e.g., via a service node's controller 152, 158 as shown with arrows 153, 159). Example service instances may include a web server, an application server, and the like. A service instance 150, 156 may also be a content switch 114 or another service that advertises itself on the network for a node controller.

Figure 2:
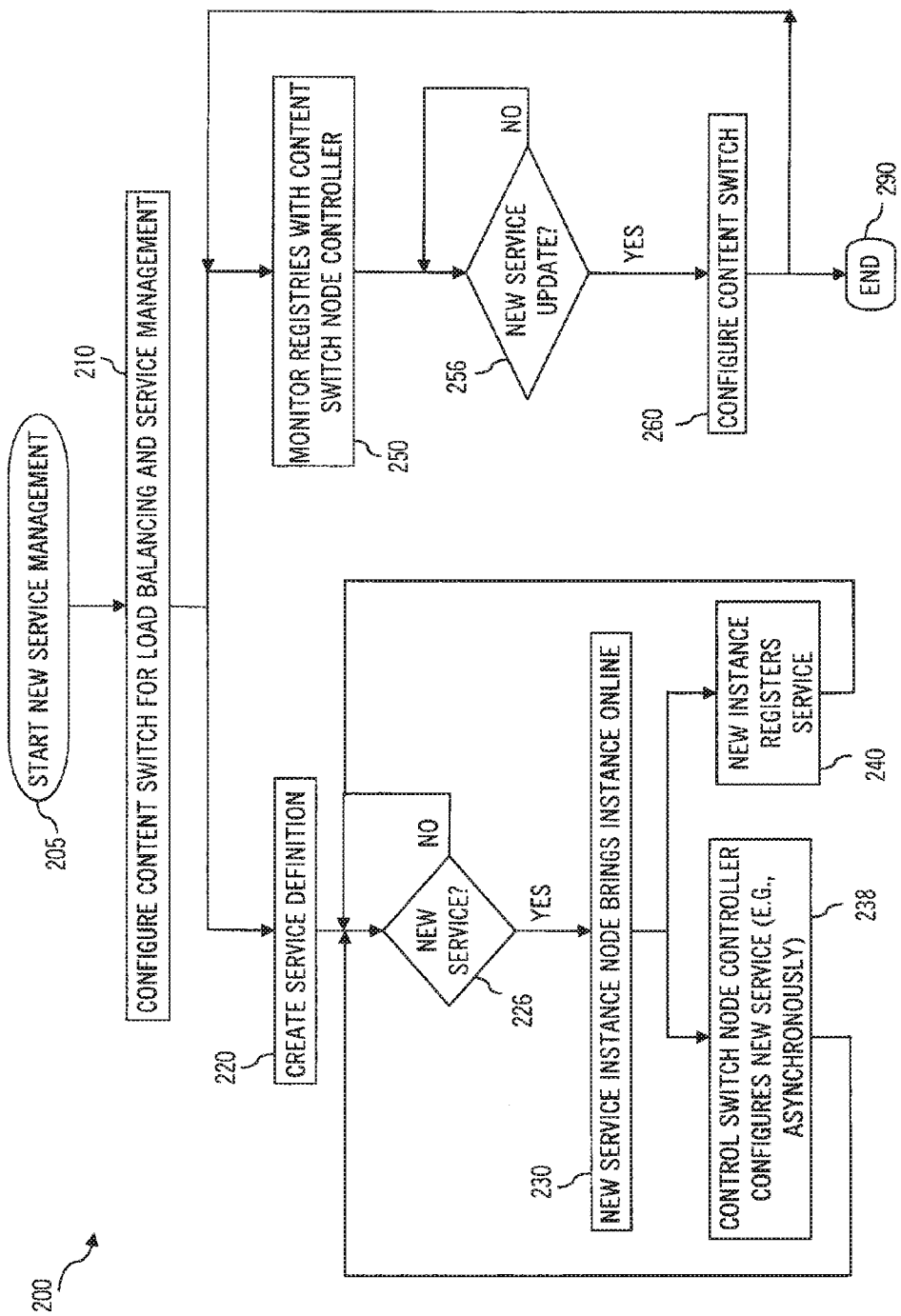
FIG. 2 is a flow diagram of a service management method as may be carried out by one or more content switches and/or via operation of a service system/datacenter as shown in FIG. 1.

FIG. 2 illustrates a method of providing service management (e.g., provides a description of new service flow) 200 as may occur during operation of the service system 110 of FIG. 1. The method 200 starts at 205 such as with providing a service system or data center 110 that may include one or more network devices 112 that are linked to an outer network or clients of services. At 210, the method 200 continues with a content switch 114 being provided in one or more of the network devices 112. Also, at 210, the content switch 114 is configured for load balancing functionality and for providing service management functions. The content switch 114 is also loaded with an auto-configuring node controller 116. The method 200 continues at 220 with creating a service definition 122 for one or more services to be provided by the service system or network 110. The service definition 122 may be stored in the service registry 120 and be created via operation of the administrative or programmatic interface 126 (e.g., via a GUI provided on a computer/workstation accessed/used by an operator/administrator of the system 110).

The method 200 continues at 226 with a determination of whether a new service 226 has been added to the service system 110. Such a determination may be made based on a new service node (or its controller 152, 158) acting to publish a service definition for an instance 150, 156 as shown with arrows 153, 159, and, in some cases, a subset 134 may be published to the native registry 130. If no new publication/advertisement of a service instance, the method 200 continues at 226. If yes, the method 200 continues at 230 with the new service instance node (or it is node controller 152, 158) bringing the new instance 150, 156 online in the system 110.

At 238 (typically asynchronously), the content switch node controller 116 may configure the new service of the system/network 110. The method 200 further includes at 240 the instance 150, 156 registering (as shown with arrows 153, 159) their service with the virtual service registry 140 (e.g., one registry 140 per VLAN or the like). The method 200 may then continue with new services coming online at 226 (such as service instances 156 being added to system 110) and registering by repeating steps 230, 238, 240.

In the method 200, the node controller 116 of the network device 112 may act at 250 to monitor registries 120, 130, and, in response to changes/updates in service access information 134 and/or service definitions 122 as determined at 256, configure the content switch 114 as needed (e.g., synchronous or asynchronous as authorized and in scope of domain/subdomain) as shown at 260. The method 200 may continue at 250 or end at 290. A new service is typically run or provided in system 110 until a configuration 134 is removed from the native registry 130 that triggers removal from the configuration of the active content switch 114 by the auto-configuration node controller 116 (at step 260 for example).

Figure 3:
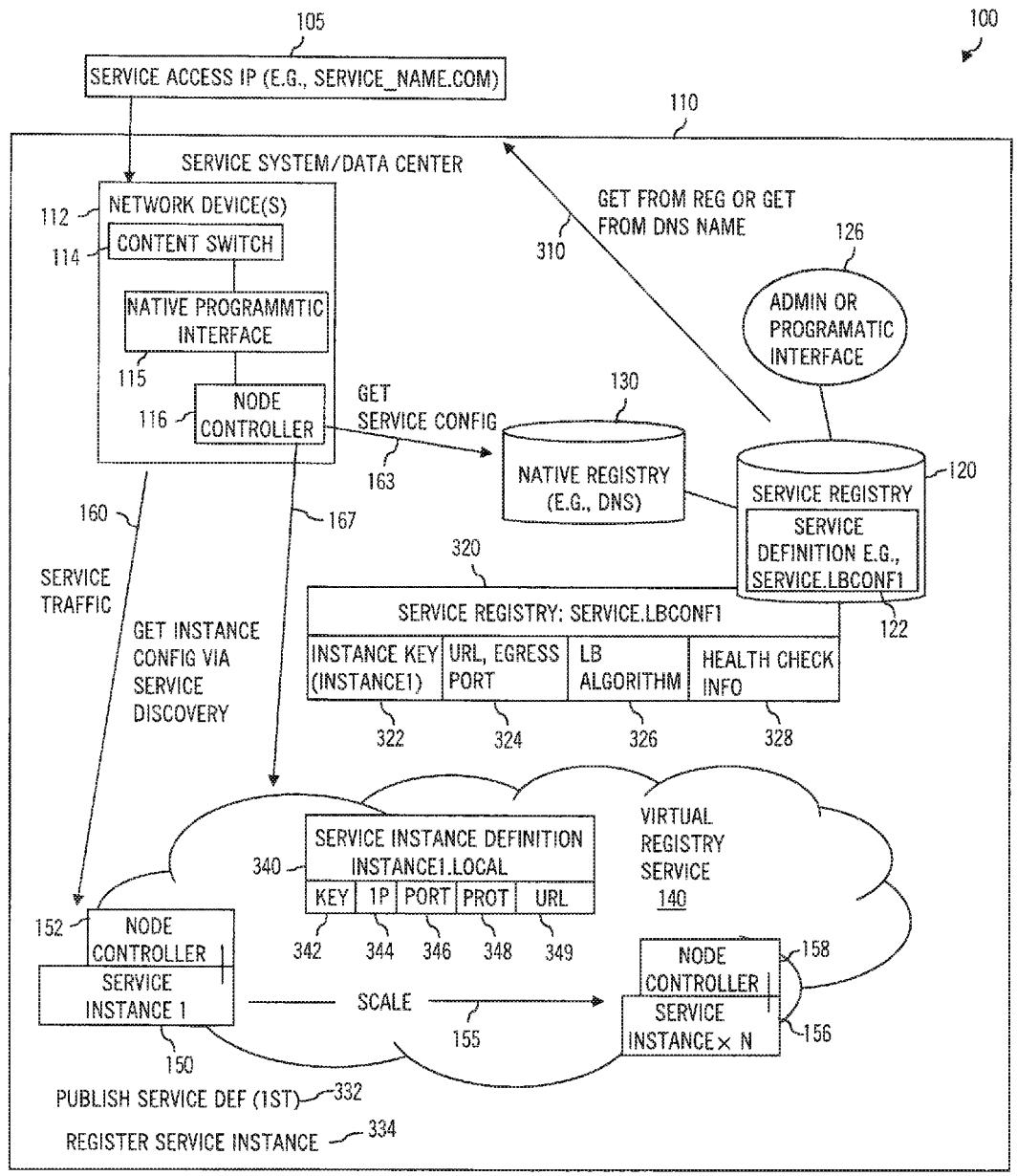
FIG. 3 is a functional block diagram of the system of FIG. 1 showing additional details and operations/functions of the service provider/management system.

FIG. 3 illustrates the system 110 providing more details on one embodiment of its implementation and/or operation with a self-configuring content switch 114. As shown, a client or requester may obtain a service name or other information useful for providing a service request 105 to the network device 112 and its content switch 114 from the service registry 310 and/or from a native registry 130 (e.g., from DNS name or the like). Also, an exemplary service definition 320 is shown in FIG. 3 as may be provided for each service associated with an active service instance 150, 156. A service definition 320 may include the service name, an instance key 322, access information 324 (e.g., URL, egress port, and so on), one or more load balancing algorithms 326 that may be used by the content switch 114 in providing access to the service, and health checking information 328.

Further, as shown (and discussed above), each service node may act for each service instance such as instance 150 to publish 332 a service definition and register 334 a service instance with the virtual registry service 140. A service instance definition 340 that is published may include a service name, an instance key 342, an IP address 344, a port 346, a protocol 348, and a URL 349 (and/or other service use/access information useful in configuring the content switch 114 to manage access to the services of the system 110).

Figure 4:
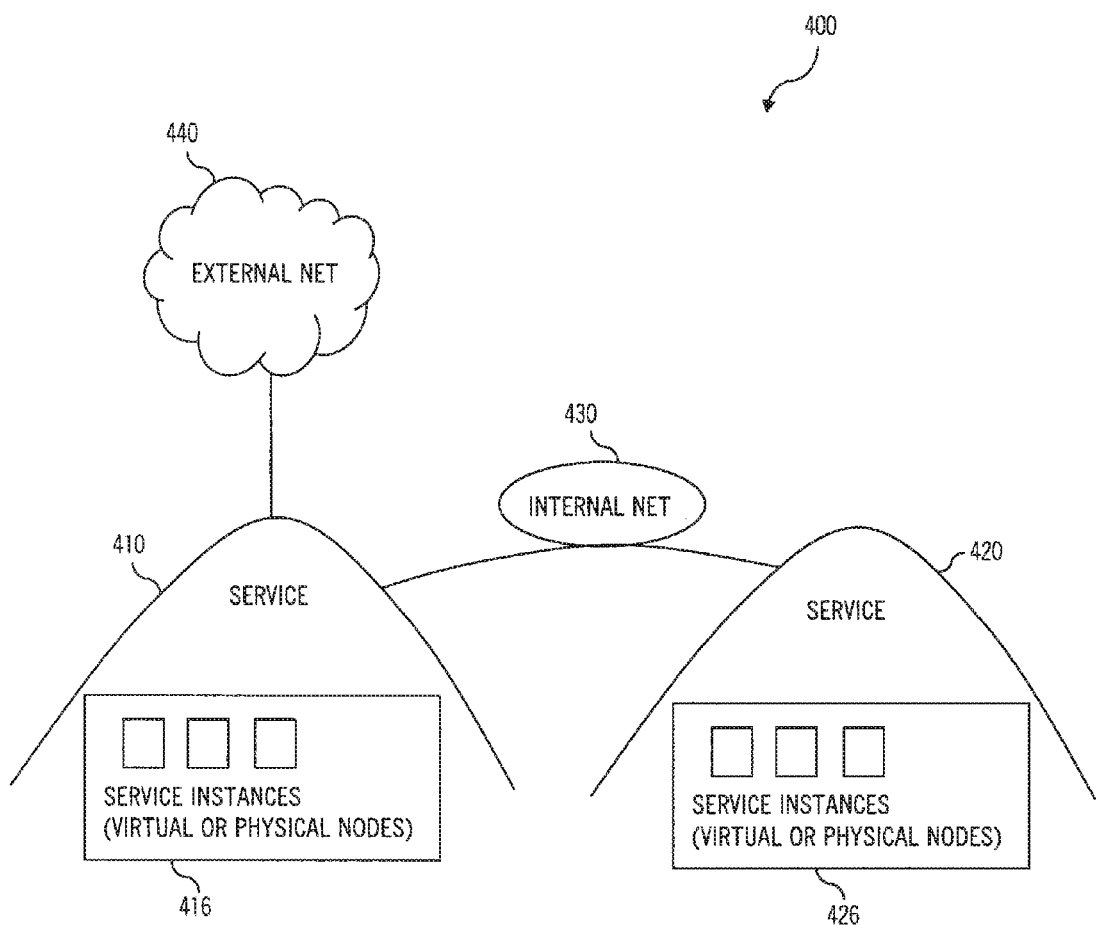
FIG. 4 illustrates a service management/provision environment in which the load balancing and service providing/management techniques described herein may be implemented.

FIG. 4 illustrates a simplified schematic of a services system or environment 400 in which a self-configuring content switch may be implemented. The system 400 includes one or more services 410, 420 that are each made up of a number or set of service instances (which may be provided via virtual and/or physical nodes) 416, 426. The services 410, 420 may communicate via an internal net 430, and the combination of the services 410, 420 and internal network 430 may provide a datacenter. An external network 440 may be communicatively linked with the service 410 and service 420 via network 430, and service access and/or requests that provide a service name and/or service access IP may be received from clients via the external network 440.

At this point, it may be useful to provide several example workflows with the first involving a public/production flow. For example, a content switch may be provided for use at a perimeter of services (such as perimeter of the service 410 or the service 420 of FIG. 4). In such a case, the service access may be available as a named service. In the workflow or service management process, the service name may be configured in a native registry. The named (and now registered) service may then be published from a service instance to a virtual registry service (e.g., once the service instance is installed on a node of a datacenter or other computer system/network node).

The native registry may be updated by the information that exists in the virtual registry (e.g., has its service access information for a new/modified service updated). A node controller provided on a network device (associated with a content switch) is operated to listen for service discovery updates. The node controller is also creating service group configurations in the content switch based on attributes provided by or retrieved from the native registry. The content switch node controller also checks against the native registry for IP addresses based on a service name (e.g., name received in request). The node controller then configures the service access IP address for the service name, and the node controller activates the service.

Another exemplary service workflow may be private/developer flow in which the content switch configures the virtual service and, in addition, the content switch becomes a service instance for outbound clients (which may be internal applications or occur in a test environment). In this workflow, IP addresses for a service access may be defined in a pool in the service registry (such as via dynamic DNS updates or the like). The service is then published from a service instance to the virtual registry service (e.g., once the service instance is installed on a system node). The native registry may be updated by the information that exists in the virtual registry service.

The content switch node controller operates to listen for service discovery updates. This node controller also creates service group configurations in the content switch based on attributes provided by or retrieved from the native registry. The node controller further acts to pull service access IP addresses from the service registry, and it configures the service access IP address for the service name. The node controller then activates the virtual service and advertises the virtual service northbound as a service instance into the northbound virtual registry service.

In another service workflow example (e.g., stratus), the content switch is implemented as a distributed system where the client for the service is an application on the same IP stack as the content switch. The content switch in this case is using the loopback interface in a system as a listener. The IP for service access is defined in a pool in the service registry (e.g., "127.0.0.100" or the like). The virtual service is marked with a distributed content switch or load balancer function in the service registry. The service is then published from the service instance to the virtual registry service (e.g., once the service instance is installed on a system or datacenter node). The native registry is updated by the information that exists in the virtual registry service.

In this workflow example, a node controller provided for or loaded on/for a content switch of a network device is listening for service discovery updates. The node controller is creating service group configurations in the content switch, e.g., based on attributes provided from the native registry. The node controller pulls the service access IP address from the service registry, and then the node controller activates the virtual service.

The load balancer techniques for managing services may be provided in a number of environments to provide more readily scalable service provider systems such as datacenters. It is understood that scalable service management across multiple computers may be challenging. Current systems such as enterprise software products often use a single node "push" model where an administrative or automation tool pushes applications on to a system where they live for some period of time-without regard to service level management beyond whether the job has completed or the knowledge about service health and capabilities of the resources for dynamic consumption. Additionally, these technologies may not be integrated and may require large software framework purchases to implement.

Certain embodiments described herein may embed distributed management into a base OS with limited centralized service knowledge and implement self-managing intelligent nodes and simple workload encapsulation and packaging. Example solutions may provide a model to provision scalable applications across Solaris nodes (or any other OS). Components of these solutions may include a client node (running, for example, dynamic service containers (DSC) daemon), a DSC registry, and a software (SW) repository that includes packages, files, and the like. In one example, a server comes online and effectively asks the registry "what can I do?" If the registry has workloads that need to be run, a node starts to process this request. The node may provision itself based on this limited context provided by the registry. The registry, in certain circumstances, may provide only the bootstrap data for the service and some metrics around service levels. Nodes may be responsible for taking care of themselves and reporting their (and their neighbors') state.

Figure 5:
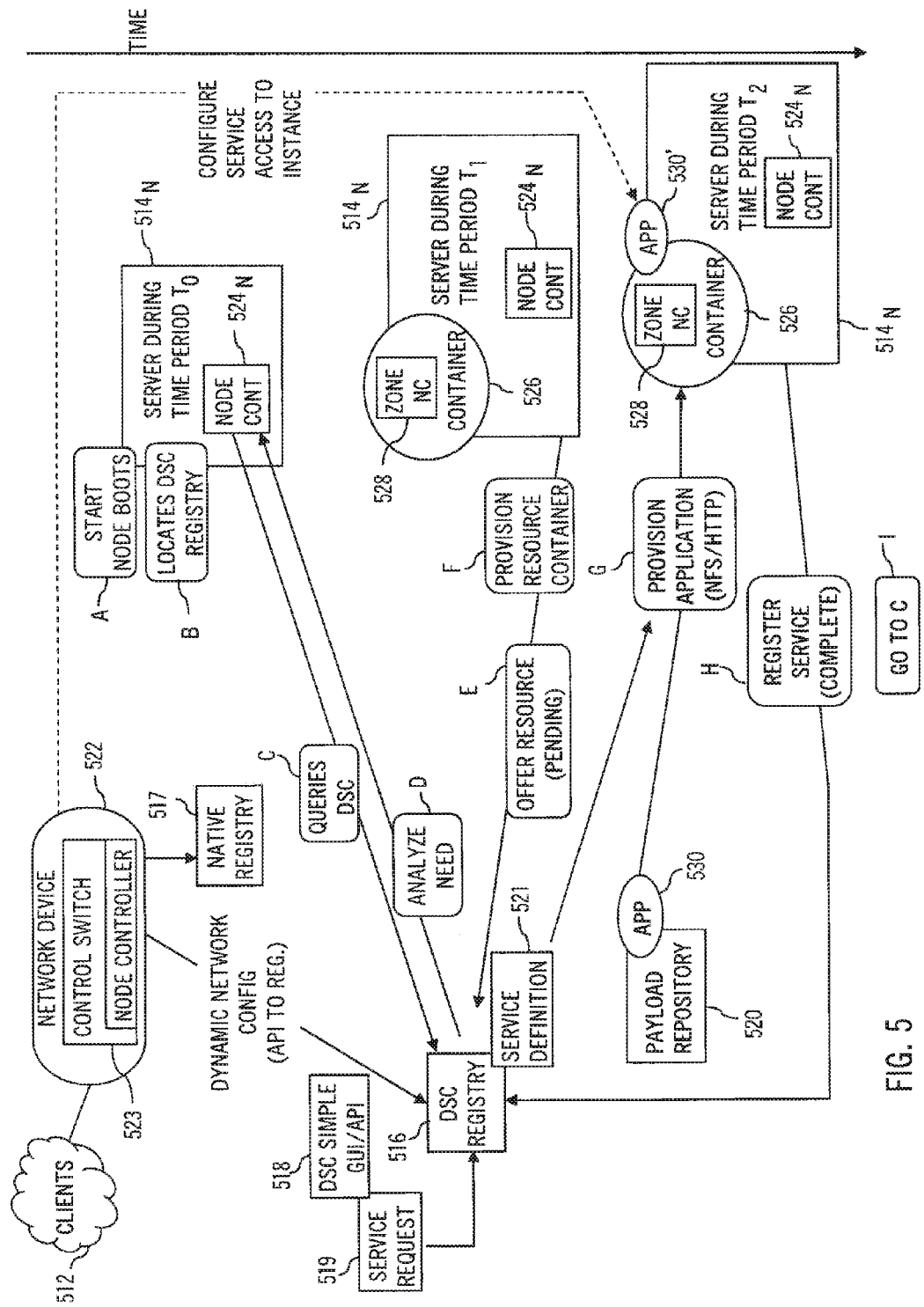
FIG. 5 is a block diagram of an embodiment of a distributed resource and service management system showing a node controller installed and running on a server/node at several points in time to provide an active service instance to a self-configuring content switch in a network device.

Referring now to FIG. 5, an embodiment of a distributed resource and service management system for one or more clients 512 may include at least one server/node 514n, a DSC or service registry 516 (e.g., that is online), a DSC simple GUI/API 518, a payload repository 520 (with defined payloads), and a network device 522. The network device 522 includes a content switch 523 that is configured for self-configuration as described above with a node controller that accesses a native registry 517 and/or a service registry 516 to provide self-configuration (as well as accessing a virtual registry service created by published service access and other service information from anode controller 524n of a service instance 530'). A user, e.g., person or another system, via the GUI/API 518 may specify a new service request 519 to be run and managed via the system. The service request 519 is then decomposed into one or more service elements or service element descriptions 521. The at least one server 514n of FIG. 5 has a DSC node controller 524n installed and running.

As known in the art, DSC is an Open Source and OpenSolaris Project built using OpenSolaris, MySQL, BASH, PHP, etc. They offer a set of software to manage scalable application deployment and service level management leveraging virtualized environments. DSC may allow the continuous policy-based automated deployment of payloads across nodes in a highly decentralized model and leverage network content load balancing, service level monitoring, and the like to allow dynamic scaling.

As indicated at "A," the node controller 524n (already installed) runs at startup. As indicated at "B," the node controller 524n may locate the DSC registry 520 via, for example, hard coding techniques, e.g., using an IP address or name resolution, or a service discovery protocol, also known as ZeroConf technologies. A node may thus be specified as belonging to a particular domain that restricts its level of responsibility. As indicated at "C," the node controller 524n may query the DSC registry 516 to pull initial configuration parameters (first time event) and apply those configuration parameters to itself, to determine if its controller software is up to date, and to subsequently query for unmet/unsatisfied service definitions, e.g., a user supplying new service requests or a change detected in a previously defined service. The node controller 524n, in this example, is reaching out to the DSC registry 516 and asking "Am I up to date? . . . . Are there any services that have yet to 530 be hosted?, etc." As indicated at "D," the node controller 524n may analyze the results it receives to determine its suitability to host the workloads, e.g., does it have the correct processor architecture?, is the current # of instances $ min instances and <max instances?

As a result of the above, the server 514n now has a container 526 and zone node controller 528 installed (by, for example, copying the server node controller 524n to the zone 526) and running. As indicated at "E," the node controller 524n may offer to host the workload and "locks" in progress state into the DSC registry 516 for service definition. As indicated at "F," the node controller 524n may begin the provisioning process on the sever 514n, e.g., the node controller 524n takes additional data from the registry, such as the software registry location and the URL, and begins the provisioning process.

As indicated at "G," the node controller 524n may locate the software repository 520 via the URL provided by the DSC registry 516, pull workloads 530, and execute, for example, the workload install.sh within the payload bundles. The resulting application/service instance 530' is then running on/within the zone 526. As indicated at "H," the node controller 524n may start the service and register the service back with the DSC registry 516 (it may notify the DSC registry 516 that it has completed the process.) As indicated at "I," the process may then restart by returning to "C."

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In some embodiments, the content switch may be adapted to provide at least four functions. First, the content switch provides virtual IP addresses (VIP) for services, which may be unique on the network and available for service requests. Second (but optionally), the content switch may provide high availability (HA) for the VIP so that if the physical node fails another node on the network may be used to host the VIP. Third, the content switch may provide a virtual service, such as for a web site, which may include information about protocol and specific content to be able to respond properly to a request. Fourth, the content switch may provide a resource pool that is a list of servers (for example) that host the services and their content.

In the described systems and methods, the units of management are services, not individual functional components. Networking functions are embedded within services so that services are fully functional, self-contained, self-sufficient, and self-provisioned networked entities that can be viewed as replicable prototypes of the service they provide. The traditional approach to automation is to implement centralized provisioning systems that deploy individual services onto target systems. This approach limits scalability since regardless of the size of the centralized system, there is always a limit to its capacity and throughput. The centralized system can break if there is a demand peak for its services that outstrips its capacity. In contrast, the described architecture assigns the deployment logic to the target systems, creating an environment where the targets are self-updating—pulling components from the appropriate repositories as required. This strategy improves scalability as the provisioning workload is handled by each target system and not by a centralized resource. Contrast this approach with the very limited level of network automation in traditional architectures and the true power of the described methods and systems is immediately apparent.

Regarding services, embodiments of systems or architectures implementing the described methods may define a hierarchical grouping of services: (a) service instances may be the atomic unit of functionality of a given service; (b) service domains or services may be collections of service instances; and (c) service modules may be a collection of service domains of different types, each with a specific role. Together, service modules form an application in some cases, and each service domain includes the specific attributes needed to reach it over the network. For example, a single Web server is a service instance in the service domain designed to provide a Web-serving service through a specific IP address that is common to all of the Web servers that are part of the service domain. The Web serving service domain provides services as a single entity, and may be made up of a subnet in a virtual LAN that includes multiple Web servers grouped for the purpose of load-balancing. If, for example, the Web-serving service domain uses a data store service domain, together they form a service module. Each service domain may be addressable by clients that connect to the service domain and not to a specific service instance. The service domains may be distinguished by their different characteristic such as protocols, ports, health monitoring implementation, and security requirements. In some embodiments, a connection between the applications and network is provided to achieve network automation. The service modules in an exemplary architecture may be designed for easy replication and distribution, allowing the application to scale on demand.

In the some exemplary architecture, the content switch with self-configuration is configured to provide load-balancing that is enhanced by implementing the networking logic locally in the service instance's containers and treating the networking logic as part of the application. This implementation makes the point of delivery (POD) self-contained in terms of network load-balancing logic. As payloads are added to the POD, the load-balancing logic embedded within each payload allows the load-balancing functionality of the POD to scale up or down as needed. In turn, the load-balancing functionality of the service domain to which the POD is assigned is also able to scale up or down. Extending this principle by co-locating other heavily-used network services with their client applications can further improve network performance and scalability.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the content switch 114, node controllers 116, 152, 158, and service instances/applications 150, 156 and the like may be provided in such computer-readable medium and executed by a processor(s) of the service system 110 or the like. The computer-readable medium can be a machine-readable storage device, a machine-readable storage substrate, a memory device, a composition of matter affecting a machine-readable propagated signal, or a combination of one or more of them. The term computer system that uses/provides the update buffer queuing and garbage collection method/processes encompasses all apparatus, devices, and machines for processing data, including by way of example a programmable processor, a computer, or multiple processors or computers. The system (such as system 110 of FIGS. 1 and 3) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide service management with a self-configuring content switch on a network device) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIGS. 1 and 3 are block diagrams illustrating one embodiment of a computer system 110 configured to implement the methods described herein. In different embodiments, computer system 110 may be or include any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion of system 110 such as to provide the interface 126 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A method of providing services in a computer network, comprising:
    providing a native registry in memory of the computer network, the native registry comprising a naming service storing service access information for services available in the computer network;
    on a node of the computer network, providing an instance of a service;
    updating securely the native registry with a set of service access information for the service associated with the provided service instance;
    providing a content switch in the computer network that is loaded with a node controller;
    for the service, obtaining service configuration information from the native registry including at least a portion of the service access information;
    asynchronously operating the content switch node controller to activate the service on the computer network including configuring the content switch based on the obtained service configuration information; and
    prior to the updating of the native registry, operating the node of the computer network to publish a service instance definition on the computer network including the set of service access information,
    wherein the service definition comprises a load balancing algorithm for the service and
    wherein the content switch node controller activating the service further comprises creating a service group configuration including the service based on the load balancing algorithm.

2. The method of claim 1, wherein the service instance definition includes a service name and wherein the content switch node controller associates an IP address with the service based on the service name.

3. The method of claim 1, wherein the service instance definition is published to a virtual registry service of the computer network and a service instance associated with the service instance definition performs the updating using information available in the virtual registry service.

4. The method of claim 1, wherein the service definition includes an IP address and a port for the service instance associated with the service.

5. The method of claim 1, wherein the content switch node controller listens on the computer network for service discovery updates indicating a new service being added to the native registry or a modification to a previously active service and, in response to one of the service discovery updates, accessing the native registry for service configuration information associated with a service name provided in the one of the service discovery updates.

6. The method of claim 5, further comprising repeating the providing an instance step with a new instance, the updating of the native registry, the obtaining service configuration information, and the operating of the content switch node controller steps for the new service being added to the computer network including synchronizing changes between a computer infrastructure and a switching or routing environment.

7. A computer system adapted for providing and managing services, comprising:
    a native registry providing a naming service for services in the computer system;
    a plurality of service instances provided on nodes of the computer system, wherein the nodes publish the services and the native registry stores service access information based on the publishing of the services including associate a subset of the service access information with a service name associated with each of the services; and
    a content switch with a node controller, the content switch node controller acting to access the native registry to obtain configuration information including the service access information for the published services, to configure a service access IP address, port, and protocol for each of the published services that is associated with the service name, and to activate the published services for access on the computer system,
    wherein the publishing of the services includes providing a service definition to the native registry that includes at least a service name and an IP address,
    wherein the system further comprises a service registry storing service information for each of the services including a load balancing algorithm and health check information, and
    wherein the content switch node controller accesses the service registry to obtain the stored service information and, in response, the content switch node controller to configure the content switch to control access to the services using the load balancing algorithm and the health check information.

8. The system of claim 7, wherein the content switch node controller listens for service discovery updates in the computer system and, in response, accesses the native registry for the configuration information and to update configuration of the content switch.

9. The system of claim 7, wherein the service definition further comprises a port, protocol, and naming information for the service instance on one of the nodes.

10. The system of claim 7, wherein the publishing by the nodes includes providing a subset of a the service definition to a virtual registry service of the computer system and wherein the native registry updates a set of service access information associated with each of the service instances by the service name based on the provided subset in the virtual registry service.

11. A load balancing method for services, comprising:
    defining an IP address in a pool in a service registry;
    installing a service instance on a node of a networked system;
    from the service instance on the node, publishing by the node a service to a virtual service registry;
    updating a native registry comprising a naming service with information for the service available via the virtual service registry; and
    operating a content switch to activate the service based on the IP address and the information from the native registry
    wherein the publishing of the service comprises advertising a subset of a service definition associated with the service instance and wherein the subset includes a service name and a load balancing algorithm for use by the content switch in providing the service.

12. The method of claim 11, wherein the content switch operates to create a service group configuration based on attributes retrieved from the native registry for the service.

13. The method of claim 11, wherein the IP address is pulled by the content switch from the service registry.

14. The method of claim 11, wherein the native registry is configured with a name for the service and wherein the content switch configures a service access IP address based on the IP address in the pool of the service registry and the service name from the native registry.

15. The method of claim 11, wherein the subset further includes health checking information for the service and access information for the service instance.

* * * * *